(12) United States Patent
Bechtle et al.

(10) Patent No.: US 11,512,890 B2
(45) Date of Patent: Nov. 29, 2022

(54) DOOR SENSOR DEVICE FOR A DOMESTIC REFRIGERATION APPLIANCE

(71) Applicant: BSH HAUSGRAETE GMBH, Munich (DE)

(72) Inventors: Teresa Bechtle, Kirchweidach (DE); Nick Flohrer, Munich (DE); Daniel Johannisborg, Holzkirchen (DE); Tobias Kuhn, Hoppstaedten (DE); Klaus Schmuecker, Starnberg (DE); Michael Strosche, Ginsheim-Gustavsburg (DE); Wilhelmus J. F. Van Geffen, Bad Kreuznach (DE)

(73) Assignee: BSH Hausgeraete GmbH, Munich (DE)

( * ) Notice: Subject to any disclaimer, the term of this patent is extended or adjusted under 35 U.S.C. 154(b) by 332 days.

(21) Appl. No.: 16/636,090

(22) PCT Filed: Jul. 31, 2018

(86) PCT No.: PCT/EP2018/070737
§ 371 (c)(1),
(2) Date: Feb. 3, 2020

(87) PCT Pub. No.: WO2019/025443
PCT Pub. Date: Feb. 7, 2019

(65) Prior Publication Data
US 2020/0158417 A1    May 21, 2020

(30) Foreign Application Priority Data
Aug. 2, 2017    (DE) .......................... 102017213425.9

(51) Int. Cl.
*F25D 23/02*    (2006.01)
*F25D 29/00*    (2006.01)
(Continued)

(52) U.S. Cl.
CPC ......... *F25D 23/028* (2013.01); *F25D 29/005* (2013.01); *G03B 15/00* (2013.01); *G03B 29/00* (2013.01); *F25D 2700/02* (2013.01)

(58) Field of Classification Search
CPC .. F25D 23/028; F25D 29/005; F25D 2700/02; G03B 15/00; G03B 29/00
See application file for complete search history.

(56) References Cited

U.S. PATENT DOCUMENTS 9,013,617 B2    4/2015 Ramachandran et al.
10,408,529 B2    9/2019 Grimminger et al.
(Continued)

FOREIGN PATENT DOCUMENTS

CN    1766500 A    5/2006
DE    102015203150 A1    8/2016
(Continued)

OTHER PUBLICATIONS

Lin Yu Chi: "The Frontier Techniques and Development Trends of Measurements & Controls and Instrumentation", Tianjin University Press, Dec. 31, 2008, pp. 84-86.

*Primary Examiner* — Jonathan Bradford
(74) *Attorney, Agent, or Firm* — Laurence A. Greenberg; Werner H. Stemer; Ralph E. Locher

(57) ABSTRACT

A sensor device can be mounted on a pivotable door of a domestic refrigeration appliance. The sensor device includes an inertial sensor for supplying a motion signal as well as a processing device configured to determine a pivoting angle of the pivotable door on the basis of the motion signal and to output a signal when the pivoting angle has reached a predetermined threshold value. A household refrigeration appliance having a sensor device is also provided.

12 Claims, 4 Drawing Sheets

(51) Int. Cl.
  *G03B 15/00* (2021.01)
  *G03B 29/00* (2021.01)

(56) References Cited

U.S. PATENT DOCUMENTS

| | | |
|---|---|---|
| 10,477,162 B2 | 11/2019 | Jain et al. |
| 2006/0107597 A1 | 5/2006 | Jin et al. |
| 2011/0005258 A1* | 1/2011 | Audet .................. H04L 65/403 340/584 |
| 2013/0031977 A1* | 2/2013 | Kempe .............. G01C 19/5642 73/504.04 |
| 2014/0144231 A1 | 5/2014 | Lin et al. |
| 2014/0313328 A1* | 10/2014 | Park ........................ F25D 29/00 348/143 |
| 2016/0057394 A1* | 2/2016 | Marutani ........... H04N 1/00095 348/143 |
| 2016/0216374 A1 | 7/2016 | Schatzberg et al. |
| 2016/0223250 A1* | 8/2016 | Kang ..................... H04N 7/183 |
| 2016/0282039 A1* | 9/2016 | Motukuri ................ F25D 29/00 |
| 2016/0343217 A1* | 11/2016 | Loidreau ................. G08B 13/08 |
| 2017/0089632 A1* | 3/2017 | Kang ................... A47F 3/0434 |
| 2017/0161975 A1* | 6/2017 | Peng .................. E05B 47/0012 |

FOREIGN PATENT DOCUMENTS

| | | |
|---|---|---|
| EP | 2599424 A1 | 6/2013 |
| KR | 1020050056696 A | 6/2005 |
| WO | 2016039785 A1 | 3/2016 |
| WO | 2017052058 A1 | 3/2017 |

* cited by examiner

DOOR SENSOR DEVICE FOR A DOMESTIC REFRIGERATION APPLIANCE

BACKGROUND OF THE INVENTION

Field of the Invention

The present invention relates to a sensor device for a household refrigeration appliance. In particular, the present invention relates to the determination of whether a pivoting door of the household refrigeration appliance has reached a predetermined threshold value.

Description of the Related Art

A household refrigeration appliance, in particular a fridge or a fridge-freezer, can be monitored in respect of its content in that a camera, which is attached to the inside of the household refrigeration appliance, takes photos at predetermined instants. This can facilitate storage or supply planning of, for example, food that is to be stored in the household refrigeration appliance.

DE 10 2015 203 150 A1 relates to a refrigerator having a pivoting door. A magnetic sensor detects when the door passes a predetermined opening angle. If this is the case, a photo of the interior of the fridge can be taken by means of the camera.

U.S. Pat. No. 2,016,216 374 A1 relates to determination of a rotary orientation of a smartphone by means of a gyro sensor.

For the determination of the posture of a person, U.S. Pat. No. 9,013,617 B2 proposes combining photos from a camera with measured values from a gyro sensor.

SUMMARY OF THE INVENTION

The present invention is based on the object of disclosing an improved technique for determining the opening angle of the pivoting door of a household refrigeration appliance.

The invention achieves this object by means of the subject matters of the independent claims. Subclaims reproduce preferred embodiments.

DISCLOSURE OF THE INVENTION

An inventive sensor device can be attached to a pivoting door of a household refrigeration appliance. The sensor device comprises an inertial sensor for providing a motion signal, and a processing device. The processing device is adapted to determine a pivoting angle of the pivoting door on the basis of the motion signal and to output a signal if the pivoting angle has reached a predetermined threshold value.

By using an inertial sensor the sensor device can be designed to be more self-sufficient, so it can be attached to the pivoting door or retrofitted with minimum effort. The inertial sensor can be reliable, precise or inexpensive.

The inertial sensor can comprise one or more acceleration sensor(s) (translational sensors) and/or one or more rotation rate sensor(s) (rotation sensors). Determination of the pivoting angle can be improved from the translational or rotation signals. In particular it is preferred that the inertial sensor comprises a rotation rate sensor. The pivoting angle of the pivoting door can be determined more simply as a result.

The motion signal of the rotation rate sensor preferably relates to a rotation rate about an axis which can run parallel to an axis of rotation of the pivoting door when the sensor device is attached to the pivoting door. The processing device is adapted to integrate the rotation rate over time in order to determine the pivoting angle. The pivoting angle can therefore be easily and directly determined on the basis of the output signal of the rotation rate sensor. The rotation rate can be, for example, periodically determined and be numerically integrated. Alternatively, an analog filter can also be used for integration.

In a preferred embodiment a signal is only output if the pivoting angle has reached a predetermined threshold limit and the pivoting door is performing a closing movement. The processing device can be adapted to integrate the value of the rotation rate over time in order to determine the pivoting angle. To detect the closing movement, the fact that, from the closed position, the threshold value is reached or exceeded for the second time, or the signal can be output if the pivoting angle reaches the threshold value and, at the same time, the rotation rate has the desired sign, can be taken into account. This can result in the advantage that the pivoting angle of the pivoting door, on reaching which, for example, a photo should be taken, can be precisely determined and the photo is taken only when the pivoting door is closing. This is advantageous since this can ensure that all items, for example in the fridge, are depicted on the photo, wherein it is possible to see the state after the user has removed desired items from or placed them in the fridge.

The inertial sensor can comprise a microelectromechanical sensor (MEMS). A sensor of this kind is conventionally constructed using semiconductor technology and comprises components with structural sizes in the region of approx. 1 to 100 µm. The microelectromechanical sensor itself can have an extent of approx. 20 to 1,000 µm in one dimension. A sensor of this kind can be inexpensively produced as a mass-produced item. During operation it can consume little energy owing to its small size. The household refrigeration appliance cannot be heated unnecessarily and an energy store of the sensor device can last longer as a result.

It is also preferred that the inertial sensor comprises an oscillating sample mass. In contrast to a rotating sample mass, the oscillating sample mass can be produced more inexpensively and be hung such that, during operation, practically no friction occurs. The power consumed by the inertial sensor can be reduced and its life increased.

The sensor device also preferably comprises a fastening mechanism which can be designed in particular for attaching the sensor device to a shelf on the inside of the pivoting door. The fastening mechanism can comprise, in particular, a bracket, a suction cup or an appropriately designed contact surface. The fastening mechanism is preferably adapted to hold the sensor device on the bottom of the shelf, so practically no storage area is lost inside the household refrigeration appliance as a result of the sensor device. Alternatively, attachment on the inside of the door is of course also possible.

It is also preferred that the processing device is adapted to determine that the pivoting door is completely closed and to calibrate the determined pivoting angle. The inertial sensor, in particular if is designed as a microelectromechanical sensor, conventionally has limited long-term stability. If the sensor is operated over a relatively long time a drift can accumulate so a movement of the pivoting door could be incorrectly determined. A fault of this kind can be compensated by occasional calibration. The determined pivoting angle can in particular be set to zero if the pivoting door is completely closed. In this way it is possible for the pivoting angle to correspond to an opening angle of the pivoting door.

The sensor device can comprise a scanner for determining that the pivoting door is open. On the one hand, the calibration described above can be simplified thereby and, on the other hand, part of the sensor device can be switched on only if the pivoting door is no longer completely closed. While conventional opening of the pivoting door on a household refrigeration appliance can reach a high angular velocity in the range of approx. 90° per second, the rotational acceleration of the pivoting door in the region of the closed state is conventionally low on opening, so a measuring error can be limited by the inertial sensor that is not immediately available. The scanner can, for example, comprise a switch which reacts when the pivoting door is moved from the completely closed position. Alternatively, the scanner can comprise a light sensor which detects the activation of interior lighting of the household refrigeration appliance as the pivoting door is opening. The scanner can also be formed in that the processing device is adapted to determine that the pivoting angle of the pivoting door does not change over a relatively long period. In addition, it can, for example, be checked whether a temperature in the region of the sensor device is below for example 8° C. to ensure that it is not a pivoting door which has been left open that is being detected.

The sensor device can also comprise a camera, wherein the processing device is adapted to take a photo by means of the camera if the pivoting angle of the pivoting door has reached the predetermined threshold value. The sensor device is preferably attached to the inside of the pivoting door for this purpose. A camera angle can be controlled better as a result.

The sensor device can also comprise a wireless communications interface, wherein the processing device is adapted to send the photo that has been taken by means of the camera via the communications interface. A receiving point can, in particular on the basis of a large number of received photos, provide improved assistance, for example when analyzing items stored inside the household refrigeration appliance.

An inventive household refrigeration appliance comprises the above-described sensor device. The sensor device is preferably detachable from the household refrigeration appliance and, in particular, adapted to work self-sufficiently, but it can also be designed such that it is permanently connected to the household refrigeration appliance or, for example, also uses its energy supply.

An inventive method for providing a signal, which indicates that a pivoting door of a household appliance has reached a predetermined pivoting angle, comprises the steps of determining a motion signal by means of an inertial sensor attached to the pivoting door; determining the pivoting angle of the pivoting door on the basis of the motion signal; and outputting the signal if the pivoting angle has reached the predetermined threshold value.

The method can be adapted in particular for execution on the processing device of the above-described sensor device. For this purpose, the method can be in the form of a computer program product having program code means.

The features disclosed in relation to one category of claims can be applied analogously to the other categories of claims. Advantages or features of the sensor device and the method can therefore be transferred in both directions.

BRIEF DESCRIPTION OF THE SEVERAL VIEWS OF THE DRAWING

The invention will now be described in more detail with reference to the accompanying figures, in which.

DESCRIPTION OF THE INVENTION

Figure 1:
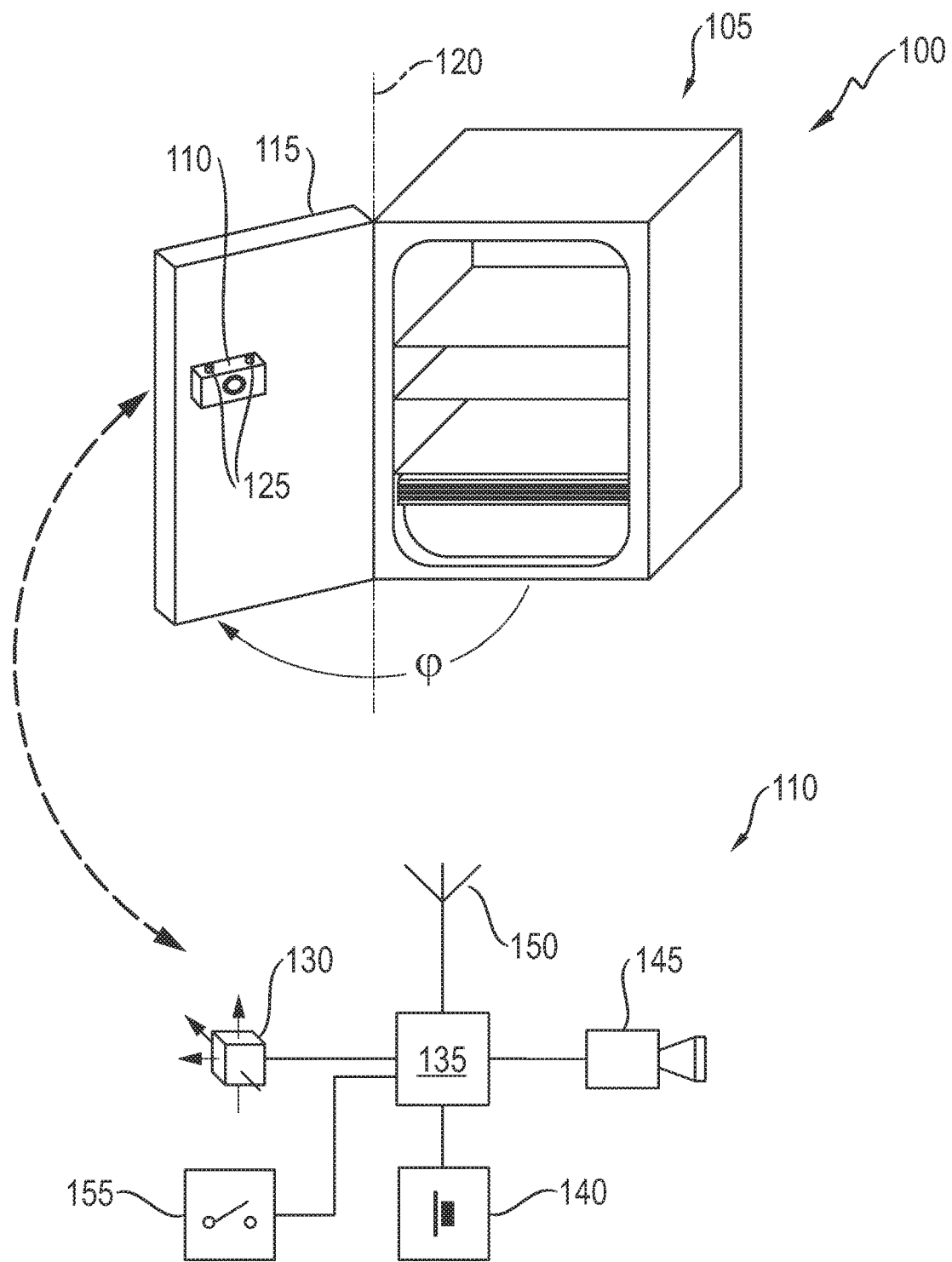
FIG. 1 shows a system with an exemplary household refrigeration appliance and a sensor device in one embodiment.

FIG. 1 shows a system 100 with an exemplary household refrigeration appliance 105 and a sensor device 110 in one embodiment. The upper region of the diagram schematically shows the sensor device 110 attached to the household refrigeration appliance 105. The lower region shows the sensor device 110 in the form of a structure diagram.

The household refrigeration appliance 105 comprises, for example, a fridge, a tabletop refrigerator, a freezer or a fridge-freezer. The household refrigeration appliance 105 comprises a pivoting door 115 which can be pivoted about an axis of rotation 120 in order to open or close the household refrigeration appliance 105. The household refrigeration appliance 105 is often adapted to be alternatively configured such that the pivoting door 115 opens to the left, as shown, or to the right. In general, the axis of rotation 120 does not have to extend in the vertical direction and instead can also run horizontally, for example, for example if the household refrigeration appliance 105 comprises a deep freezer.

The sensor device 110 preferably comprises a fastening mechanism 125 in order to attach it in the region of the pivoting door 115. In the simplified diagram of FIG. 1 the fastening mechanism 125 comprises, for example, one or more suction cup(s), in particular for attaching to a shelf on the pivoting door 115. Other fastening mechanisms 125, for example with positive locking or by means of a clamping effect, are also conceivable. The sensor device 110 is preferably adapted to be able to operate self-sufficiently. For this purpose, the sensor device 110 can be attached to or be removed from the pivoting door 115 in particular without the use of tools. Retrofitting of an existing household refrigeration appliance 105 can be simplified thereby.

The sensor device 110 comprises an inertial sensor 130, a processing device 135, and preferably a local energy supply 140. The sensor device 110 can optionally comprise a camera 145, a preferably wireless communications interface 150 and/or a scanner 155.

The inertial sensor 130 is adapted to detect a movement or change in movement. The inertial sensor 130 preferably comprises a rotation rate sensor which is adapted to determine a rotation rate which is based on an axis running parallel to the axis of rotation 120 of the pivoting door 115 or coinciding therewith. The processing device 135 can in particular comprise a programmable microcomputer or microcontroller. The local energy supply 140 preferably comprises a battery or an accumulator. In a further embodiment an interface for connection of the sensor device 110 to an energy network of the household refrigeration appliance 105 can be provided. The sensor device 110 can preferably be supplied with electrical energy from the household refrigeration appliance 105 via this interface.

In respect of its orientation and/or focal length, the camera 145 is preferably adapted to photograph a content of the household refrigeration appliance 105 if an angle of rotation φ of the swing door 115 of the household refrigeration appliance 105 has reached a predetermined threshold value. For this purpose the camera 145 can comprise a flash unit.

The communications interface 150 is preferably wireless and can operate, for example, according to the WMAX, Bluetooth or WLAN standard.

It is proposed that the processing device 135 determines the angle of rotation φ of the pivoting door 115 of the household refrigeration appliance 105 on the basis of a signal of the inertial sensor 130, compares it with a threshold value and activates the camera 145 as a function of the comparison result to take a photo of the interior of the household refrigeration appliance 105. Unlike in the upper diagram of FIG. 1, the angle of rotation φ is conventionally less than 90°, so the camera 145 can preferably see the entire interior of the household refrigeration appliance 105. It is generally preferred that the sensor device 110 is provided at an optimally large radial distance from the axis of rotation 120 of the pivoting door 115 of the household refrigeration appliance 105. A perspective of the camera 145 can be improved thereby. In addition, determination of an acceleration signal by means of the inertial sensor 130 can be simplified thereby.

Figure 2:
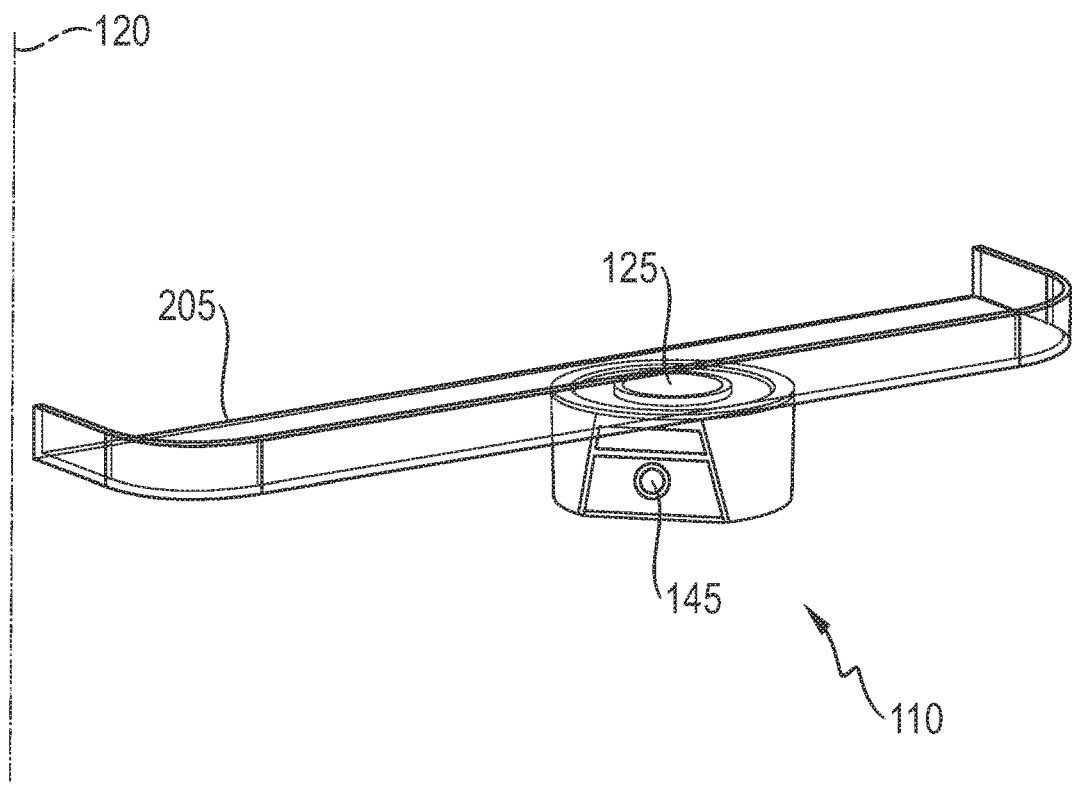
FIG. 2 shows a sensor device in a further embodiment.

FIG. 2 shows a sensor device 110 in a further embodiment. The sensor device 110 is substantially implemented in the form of a flat cylinder and, preferably on its upper side, carries the fastening mechanism 125. The sensor device 110 is preferably adapted for attachment under a shelf 205 which can be fastened to the inside of the pivoting door 115 of a household refrigeration appliance 105. The shelf 205 preferably comprises a glass plate or plastics material plate on which the fastening mechanism 125 designed as a suction cup can act advantageously effectively.

If the inertial sensor 130 is a rotation rate sensor, which is adapted to provide a rotation rate, the processing device 135 can determine the pivoting angle φ on the basis of the following correlation:

$$\theta = \int_{o}^{t} \omega \partial t;$$

where θ is the pivoting angle (φ), w the rotation rate and t the integration time.

Figure 3:
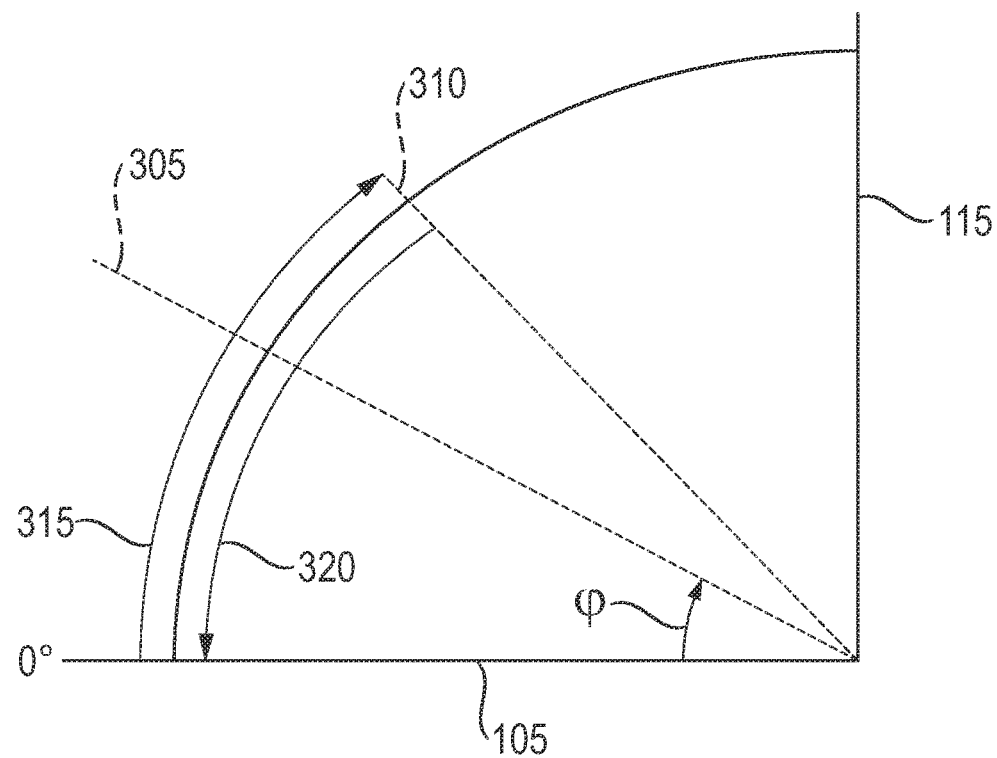
FIG. 3 shows exemplary characteristics of a sensor device on a household refrigeration appliance.
Figure 3:
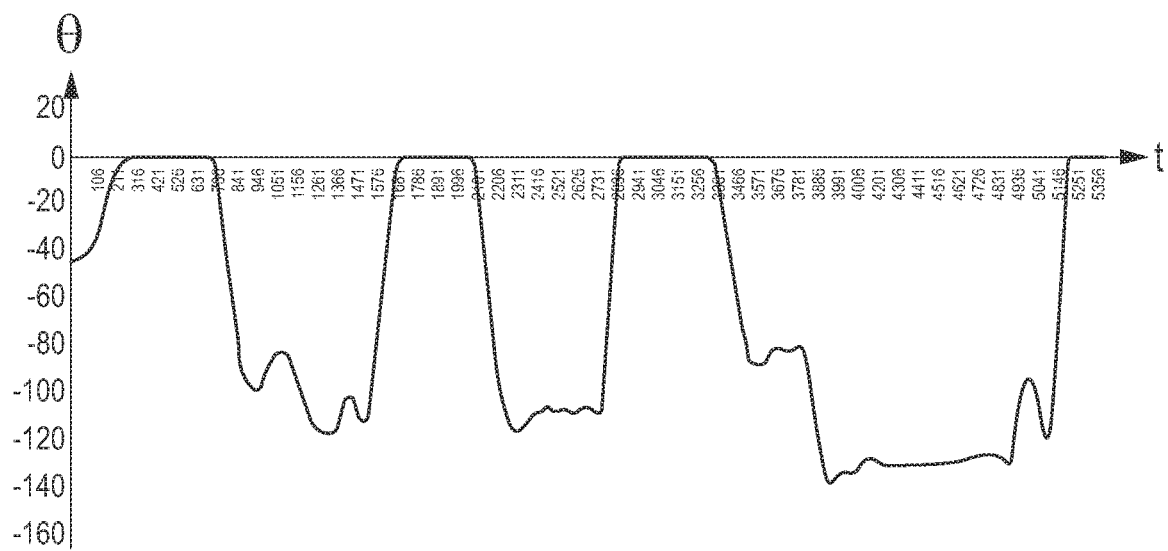

FIG. 3 shows by way of example characteristics of a sensor device 110 on a household refrigeration appliance 105 of the type in FIG. 1. The upper region shows a schematic diagram of the household refrigeration appliance 105 and the lower region a characteristic over time of the determined pivoting angle φ. The pivoting angle φ was integrated over time in the manner disclosed above on the basis of measured values of a rotation rate sensor 130 on the pivoting door 115. The illustrated variables should be understood as examples.

FIG. 3 schematically shows a position of the pivoting door 115 in which the camera 145 is to be activated in order to produce a photo, as a threshold value 305. The threshold value 305 is preferably smaller than a conventional pivoting angle 310 which occurs when a user opens the pivoting door 115 and closes it again. FIG. 3 shows an exemplary opening movement 315 and a closing movement 320 corresponding therewith.

It is preferred that the described photo is taken if the pivoting angle φ reaches the threshold value 305 or exceeds it and the pivoting door 115 is performing the closing movement 320. For this, it can be determined either that, from the closed position (φ=0°), the threshold value 305 is being reached or exceeded for the second time, or the photo can be activated if the angle of rotation φ has reached the threshold value 305 and, at the same time, the rotation rate w has the desired sign. In the present illustration, ω>0 if the closing movement 320 is being performed.

Figure 4:
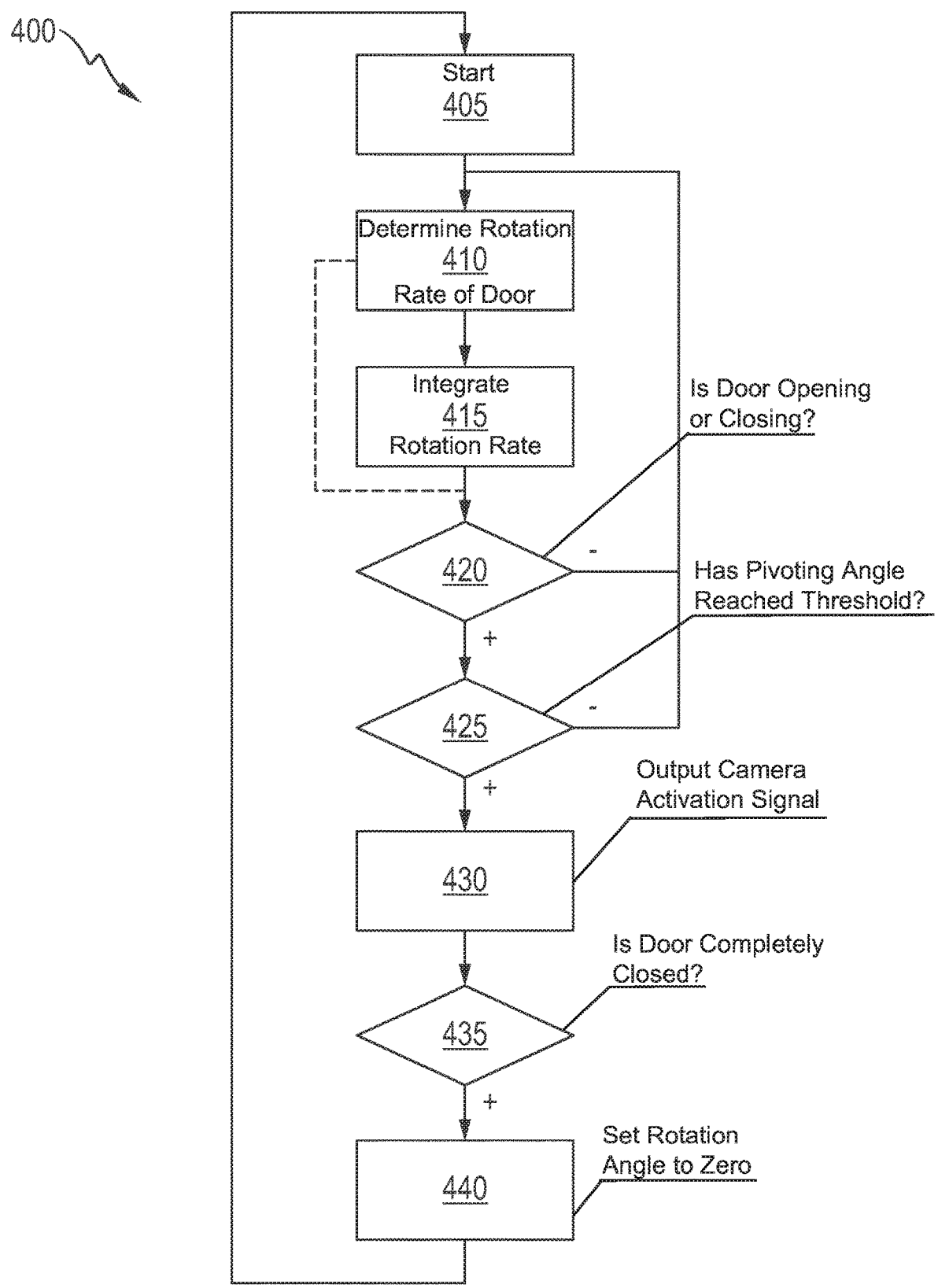
FIG. 4 shows a flowchart of an exemplary method.

FIG. 4 shows a flowchart of an exemplary method 400. The method 400 is preferably adapted to control a sensor device 110 of the type in FIG. 1. The method 400 begins in a step 405. In a step 410 the rotation rate of the pivoting door 115 is determined by means of an inertial sensor 130 designed as a rotation rate sensor. In a step 415 the rotation rate is integrated over time in order to determine the angle of rotation cp. It can be optionally determined in a step 420 whether the pivoting door 115 is performing the opening movement 315 or the closing movement 320, as has been described above. If the incorrect movement 315 is present, the method 400 can return to step 410. Otherwise, it can be checked in a step 425 whether the pivoting angle φ has reached the predetermined threshold value 305. If this is not the case, the method 400 can continue with step 410.

Otherwise, in a step 430 a signal can be output which can be used, for example, to activate the camera 145 to take a photo. A flash device can also be triggered. The finished photo can then be transmitted by means of the communications interface 150 to an external location. The method 400 can then return to the start again.

In a preferred embodiment the determined angle of rotation φ can be calibrated in advance, however. For this, it is determined in a step 435 whether the pivoting door 115 of the household refrigeration appliance 105 is completely closed. For this, it is preferably ascertained that the rotation rate remains constant over a predetermined time or the determined angle of rotation φ substantially does not change over this time. If it is not possible to determine that the pivoting door 115 is closed, the calibration attempt can be terminated and the method 400 can return to the start. Otherwise, the determined angle of rotation φ can be set at a predetermined value, in particular the value zero, in a step 440. The method 400 can then return to the start and run through again.

Calibration of the determined angle of rotation φ in steps 435, 440 can also be carried out at a different point of the method 400. In addition, on the basis of the state of the pivoting door 115 determined in step 435, the inertial sensor 130 can only be switched on when the pivoting door 115 has already left its completely closed position. The inertial sensor 130 can be switched off again a predetermined time after the pivoting door 115 has reached the completely closed position again.

LIST OF REFERENCE NUMERALS 100 system
105 household refrigeration appliance
110 sensor device
115 pivoting door
120 axis of rotation
125 fastening mechanism
130 inertial sensor
135 processing device
140 energy supply
145 camera
150 wireless communications interface
155 scanner
205 shelf
305 threshold value
310 conventional pivoting angle
315 opening movement
320 closing movement
400 method
405 start
410 determine rotation rate 415 determine pivoting angle
420 return path?
425 threshold value reached?
430 trigger camera, trigger flash, transmit photo
435 door closed?
440 calibrate pivoting angle

The invention claimed is:

1. A sensor device adapted to be attached to a pivoting door of a household refrigeration appliance, the sensor device comprising:
   an inertial sensor for providing a motion signal; and
   a processor, said processor configured to determine a pivoting angle of the pivoting door based on the motion signal, said processor configured to determine the pivoting door being completely closed and to calibrate the determined pivoting angle when the door is closed, and said processor configured to output a signal upon the pivoting angle reaching a predetermined threshold value.

2. The sensor device according to claim 1, wherein said inertial sensor includes a rotation rate sensor.

3. The sensor device according to claim 2, wherein:
   the sensor device is attached to the pivoting door and the pivoting door has an axis of rotation;
   the motion signal relates to a rotation rate about an axis parallel to the axis of rotation of the pivoting door; and
   said processor is configured to integrate the rotation rate over time to determine the pivoting angle.

4. The sensor device according to claim 1, wherein said processor is configured to output the signal only upon the pivoting angle reaching the predetermined threshold value and the pivoting door performing a closing movement.

5. The sensor device according to claim 1, wherein said inertial sensor is a micro-electromechanical sensor.

6. The sensor device according to claim 1, wherein said inertial sensor includes an oscillating sample mass.

7. The sensor device according to claim 1, which further comprises a fastener for attaching the sensor device to a shelf on an inside of the pivoting door.

8. The sensor device according to claim 1, which further comprises a scanner for determining that the pivoting door is open.

9. The sensor device according to claim 1, which further comprises a camera, said processor being configured to take a photo by using said camera upon the pivoting angle of the pivoting door reaching the predetermined threshold value.

10. The sensor device according to claim 9, which further comprises a wireless communications interface, said processor being configured to send the photo that has been taken over said communications interface.

11. A household refrigeration appliance, comprising a sensor device according to claim 1.

12. A method for providing a signal indicating a pivoting door of a household appliance reaching a predetermined pivoting angle, the method comprises the following steps:
   using an inertial sensor attached to the pivoting door to determine a motion signal;
   determining the pivoting angle of the pivoting door based on the motion signal;
   using a processor to determine the pivoting door being completely closed and to calibrate the determined pivoting angle when the door is closed; and
   outputting the signal upon the pivoting angle reaching a predetermined threshold value.

* * * * *